United States Patent
Wehner

(10) Patent No.: US 9,067,341 B2
(45) Date of Patent: *Jun. 30, 2015

(54) TWO-COMPONENT COMPOSITION FOR PRODUCING FLEXIBLE POLYURETHANE GEL COATS

(75) Inventor: Jochen Wehner, Hamburg (DE)

(73) Assignee: MANKIEWICZ GEBR. & CO. (GMBH & CO. KG), Hamburg (DE)

( * ) Notice: Subject to any disclaimer, the term of this patent is extended or adjusted under 35 U.S.C. 154(b) by 1040 days.

This patent is subject to a terminal disclaimer.

(21) Appl. No.: 10/572,785

(22) PCT Filed: Sep. 16, 2004

(86) PCT No.: PCT/EP2004/010416
§ 371 (c)(1),
(2), (4) Date: Mar. 21, 2006

(87) PCT Pub. No.: WO2005/030893
PCT Pub. Date: Apr. 7, 2005

(65) Prior Publication Data
US 2007/0117947 A1    May 24, 2007

(30) Foreign Application Priority Data
Sep. 23, 2003 (DE) .................. 103 44 379

(51) Int. Cl.
| C08G 18/00 | (2006.01) |
| B29C 37/00 | (2006.01) |
| C08G 18/32 | (2006.01) |
| C08G 18/38 | (2006.01) |
| C08G 18/66 | (2006.01) |
| C08G 18/78 | (2006.01) |
| C08G 18/79 | (2006.01) |
| C09D 175/12 | (2006.01) |

(52) U.S. Cl.
CPC ........ *B29C 37/0032* (2013.01); *C08G 18/3243* (2013.01); *C08G 18/3814* (2013.01); *C08G 18/6618* (2013.01); *C08G 18/7831* (2013.01); *C08G 18/792* (2013.01); *C09D 175/12* (2013.01); *B29C 2037/0035* (2013.01); *C08G 2220/00* (2013.01)

(58) Field of Classification Search
USPC .......................................................... 528/44
See application file for complete search history.

(56) References Cited

U.S. PATENT DOCUMENTS

| 3,217,536 | A | * | 11/1965 | Motsinger et al. ......... 73/170.15 |
| 3,520,747 | A | | 7/1970 | McGaughey |
| 3,607,600 | A | | 9/1971 | Schreter et al. |
| 3,646,651 | A | | 3/1972 | McGaughey et al. |
| 3,765,979 | A | | 10/1973 | Thomas |
| 4,089,215 | A | * | 5/1978 | Chapin ..................... 73/114.32 |
| 4,267,299 | A | | 5/1981 | Oechsle, III |
| 4,368,568 | A | | 1/1983 | Watanabe |
| 4,508,619 | A | * | 4/1985 | Niitti et al. ..................... 209/169 |
| 4,571,798 | A | | 2/1986 | Adams |
| 4,581,433 | A | | 4/1986 | Potter et al. |
| 4,950,792 | A | | 8/1990 | Althaus et al. |
| 5,026,815 | A | | 6/1991 | Völker et al. |
| 5,077,371 | A | * | 12/1991 | Singh et al. ..................... 528/64 |
| 5,128,433 | A | * | 7/1992 | LeCompte et al. ............. 528/60 |
| 5,340,652 | A | * | 8/1994 | Sondhe et al. ................ 428/413 |
| 5,362,834 | A | | 11/1994 | Schäpel et al. |
| 5,387,750 | A | | 2/1995 | Chiang |
| 5,486,096 | A | * | 1/1996 | Hertel et al. .................. 416/224 |
| 5,607,998 | A | | 3/1997 | Markush et al. |
| 5,656,677 | A | | 8/1997 | Jourquin et al. |
| 5,739,247 | A | * | 4/1998 | Lesko et al. .................... 528/60 |
| 5,760,098 | A | | 6/1998 | Haas et al. |
| 5,895,689 | A | | 4/1999 | Gajewski |
| 5,895,806 | A | | 4/1999 | Gajewski |
| 5,962,617 | A | | 10/1999 | Slagel |
| 6,013,692 | A | | 1/2000 | Daum et al. |
| 6,046,297 | A | | 4/2000 | Rosenberg et al. |
| 6,187,892 | B1 | * | 2/2001 | Markusch et al. ............. 528/68 |
| 6,821,059 | B2 | * | 11/2004 | Markusch et al. ......... 405/302.7 |
| 2003/0134063 | A1 | * | 7/2003 | Vance et al. ................. 428/35.7 |
| 2004/0211130 | A1 | * | 10/2004 | Horstman et al. .............. 52/177 |
| 2005/0019198 | A1 | * | 1/2005 | Salomon ....................... 418/268 |
| 2005/0075450 | A1 | * | 4/2005 | Raday et al. .................. 524/589 |
| 2005/0224610 | A1 | * | 10/2005 | Egan et al. ................. 241/46.17 |

FOREIGN PATENT DOCUMENTS

| DE | 690 11 540 T | 12/1994 |
| DE | 197 32 313 | 2/1998 |
| DE | 198 36 193 A | 12/1999 |
| DE | 102 12 391 A1 | 10/2003 |
| EP | 0026915 A2 | 4/1981 |
| EP | 0 511 570 | 11/1992 |
| EP | 1131366 A1 | 9/2001 |
| WO | WO 87/07287 A | 12/1987 |
| WO | 0018816 | 4/2000 |
| WO | WO 03/078534 | 9/2003 |
| WO | WO 03/078534 A | 9/2003 |

OTHER PUBLICATIONS

International Search Report in English.
"Szycher's Handbook of Polyurethanes", CRC Press, Boca Raton, 1999. (Spec, p. 13).
Bielemann, Johan H., "Lackadditive", Weinheim, Wiley-VCH, 1998. (Spec, p. 13).
Flemming, M., G. Ziegmann and S. Roth, "Faserverbundbauweisen", Springer, Berlin, Heidelberg, New York, 1996. (Spec, p. 15).

* cited by examiner

*Primary Examiner* — Megan McCulley
(74) *Attorney, Agent, or Firm* — Abel Law Group, LLP

(57) ABSTRACT

The invention relates to the use of a two-component composition comprising a polyol component and a polyisocyanate component, for producing flexible polyurethane gel coats for epoxy-resin and vinyl-ester resin composite materials.

18 Claims, No Drawings

TWO-COMPONENT COMPOSITION FOR PRODUCING FLEXIBLE POLYURETHANE GEL COATS

CROSS REFERENCE TO RELATED APPLICATIONS

Applicant claims priority under 35 U.S.C. §119 of German Application No. 103 44 379.7 filed Sep. 23, 2003. Applicant also claims priority under 35 U.S.C. §365 of PCT/EP2004/010416 filed Sep. 16, 2004. The international application under PCT article 21(2) was not published in English.

The invention concerns the use of a two-component composition, which comprises a polyol component and a polyisocyanate component, for the production of flexible polyurethane gel coats for epoxy resin and vinyl ester composite materials. The invention in addition concerns a production method for the composite material and the composite material.

The surfaces of composite materials (for example composite materials made of glass fibre fabric or nonwoven and epoxy resin/vinyl ester resin) are often of poor appearance and in addition not resistant to light and weathering. They must therefore be provided with a surface coating. Before the surface coating of epoxy resin/vinyl ester resin composite materials, they must be polished and filled (levelled out), since erection of fibres often occurs during direct surface coating of the composite material. An alternative to this is the use of a gel coat.

A gel coat is a resin system which can be applied onto moulded parts of composite structure for the production of smooth (building) component surfaces and at the same time results in an attractive and optionally light- and weathering-resistant surface. In the in-mould process, the gel coat resin system, after the mixing of its reaction components, is introduced into a mould as a first layer within the processing time (pot life). The layer obtained after gelling is sufficiently mechanically stable not to be damaged during the application of the synthetic resin (for example an epoxy resin or vinyl ester resin) and optionally an inorganic or organic nonwoven or fabric (for example a glass fibre fabric or glass fibre nonwoven). The same applies during injection processes and during the application of wet laminates and during the application of prepregs.

In order to ensure adequate adhesion between (i) synthetic resin (epoxy resin and/or vinyl ester resin) and (ii) gel coat, the coating with synthetic resin must take place within the lamination time of the gel coat resin system. Thereafter, the synthetic resin and gel coat resin system are cured completely.

In the description of the invention, the following definitions of terms apply:
The lamination time is the period beginning with the tack-free time of the gel coat film applied into the mould, in which period the gel coat must be overlaid with laminate in order still to ensure adequate adhesion between gel coat and laminate.
The pot life is the period beginning with the mixing of the two reaction components until the gelling of the reaction mixture. After the end of the pot life, the reaction mixture is no longer processable.
The tack-free time is the period beginning with the application of the homogeneous, mixed reaction mixture onto the mould surface until the applied film becomes tack-free.
Gel time is understood to mean the time measured until the gelling of the reaction mixture, described in section 9.2.1 of E-DIN VDE 0291-2 (VDE 0291 Part 2): 1997-06.

As gel coat resin systems, formulations based on radical-curing resins such as e.g. unsaturated polyesters (UP), vinyl esters or acrylate-terminated oligomers are for example used. These resin systems are reliable in processing during use in combination with UP resins (UP composite materials) and display good adhesion to a large number of synthetic resins (composite material adhesion), since owing to the atmospheric oxygen-inhibited curing reactions at the gel coat surface lying within, curing of the interface only takes place after the application of the synthetic resin. However, many commercial UP-based gel coats do not display adequate gloss retention and tend to chalking and crazing. Other disadvantages of UP-based gel coats are the unavoidable emissions of monomers, frequently very severe shrinkage during curing, which leads to tensions in the composite material/gel coat interface, and hence to poor stability of the interface, and the usually poor adhesion towards composite materials based on epoxy resin (EP resin) or vinyl ester resin (VE resin).

For use in combination with EP composite materials, EP gel coats (e.g. from the company SP Systems) can for example be used. Compared to UP gel coats, EP gel coats display very much better adhesion to EP composite materials. EP gel coats also contain no volatile monomers and therefore give less cause for concern as regards industrial hygiene than the mostly styrene-containing UP gel coats. The disadvantages of EP gel coats are however:
the lower tolerance towards inaccuracies in the mixing ratio; this can lead to discolorations in the cured gel coat and greatly reduced mechanical strength.
the strongly exothermic curing reaction, which allows only small batch sizes,
that the curing reaction sets in very suddenly,
the inadequate stability to weathering,
the very poor stability to thermal yellowing,
the usually high glass transition temperature (70° C., SP Systems gel coat) and hence the brittleness of the material at use temperatures far below the glass transition temperature and
the high price of reasonably yellowing-resistant EP resins.

Essentially therefore, for applications in which high light and weathering stability is required, preference should be given to surface coatings based on aliphatic polyurethanes. However, in the formulation of PU gel coats it must be borne in mind that conventional mixtures of polyol and polyisocyanate only gel when the reaction is very far advanced. Then however, the reactivity and hence adhesive capacity of the PU gel coat towards the synthetic resin used for the composite material is already severely limited (i.e. the tack-free time is comparatively long, and conversely the lamination time comparatively short). The use of such a conventional product would be difficult to implement with regard to process technology and also unreliable as regards gel coat/synthetic resin adhesion.

Normal commercial aliphatic PUR gel coats (from Relius Coatings or Bergolin) as a rule have comparatively low glass transition temperatures (<40° C.). Consequently they are less brittle than EP gel coats and usable at curing temperatures below 80° C. and can be overlaid with liquid epoxy resin laminates. The products as a rule contain reactive diluents such as e.g. polycaprolactone, which under the usual curing conditions does not completely react and then acts as a plasticiser. The products are therefore very flexible directly after removal from the mould (elongation at break ca. 25%). However they become brittle with time, presumably due to the loss of plasticisers, so that their elongation at break falls to about half of the original value. At curing temperatures (>80° C.) lying markedly higher than the maximum achievable glass transition temperature $T_g$ of the PUR gel coat, these products often display surface defects in the form of sink marks after removal from the mould. This severely restricts the range of curing temperatures in which such a product can be used.

To shorten the process round times in the manufacture of epoxy laminates, in particular when an epoxy prepreg is used for laminate construction, curing temperatures over 80° C. are often used. This is also necessary when high requirements as regards hot dimensional stability are specified for the laminate. In use in processes with curing temperatures >80° C., normal PUR gel coats often display surface defects in the form of sink marks after removal of the building component from the mould. For this reason, the use of PUR gel coats at curing temperatures of >80° C. is only possible to a limited extent and often necessitates costly subsequent processing for smoothing of the component surface.

Consequently, it was the object of the invention to provide components for a polyurethane-based gel coat resin system which do not display the said disadvantages. The components for the gel coat resin system should:

provide a comparatively long lamination time with a pot life sufficient for the mixing and introduction into the mould and gel and tack-free times sufficient for film formation, but comparatively short, be easily processable (i.e. require no additional devices for hot application and/or spray application), provide good adhesion between gel coat and synthetic resin (in particular to epoxy resins, with long lamination times), give a gel coat which is resistant to light and weathering and has no tendency to crazing, create a smooth component surface, free from sink marks even with curing temperatures between 80° C. and 130° C. and be inexpensive.

In principle, polyurethane gel coats with a high crosslinking density would be especially suitable for this. A high crosslinking density requires the use of a highly functionalised polyol. However, the use of a highly functionalised polyol is associated with a very short lamination time. Hence it was also an object of the present invention to provide components for a flexible polyurethane gel coat which on the one hand result in a gel coat with a high crosslinking density, but on the other hand also allow a prolongation of the lamination time.

This problem is solved through the use of a two-component composition, which comprises A) a polyol component, which contains
A1) one or several low molecular weight polyols with a molecular weight of 160 to 600 g/mol and a hydroxyl group concentration of 5 to less than 20 mol hydroxyl groups per kg of low molecular weight polyol,
A2) one or several higher molecular weight polyols with an average functionality of ≥2 and a hydroxyl group concentration of less than 5 mol hydroxyl groups per kg of higher molecular weight polyol and
A3) one or more light-resistant aromatic amines, and
B) a polyisocyanate component which contains one or several polyisocyanates, for the production of flexible polyurethane gel coats for synthetic resin composite materials, wherein the synthetic resin comprises epoxy resin and/or vinyl ester resin and is not, or not completely, cured at the time when it is brought into contact.

The invention is inter alia based on the finding that light-resistant aromatic amines can be added to a polyol component for the production of polyurethane gel coats and the mixture produced from the polyol component according to the invention and a polyisocyanate component displays especially good processing properties in the production of polyurethane gel coats and moreover results in an especially light-resistant gel coat. Cured gel coats according to the invention preferably have a Shore D hardness of more than 65 (determined as per DIN EN ISO 868), and the elongation at break at 23° C. is preferably greater than 3%, more preferably greater than 5%, in particular greater than 10% (determined as per ASTM-D 522) and result in excellent adhesion to epoxy and vinyl ester resins in composite materials. As epoxy resins and vinyl ester resins, all normal commercial materials are suitable. A person skilled in the art is capable of selecting a suitable epoxy and vinyl ester resin depending on the use of the composite material.

The cured composite material has an adhesive strength at the synthetic resin—polyurethane gel coat interface which is greater than the breaking strength of the laminated resin, i.e. in the plunger pull-of test a cohesion fracture occurs in the synthetic resin laminate or synthetic resin.

The synthetic resin comprises epoxy resin and/or vinyl ester resin, i.e. it is a synthetic resin based on epoxy resin and/or vinyl ester resin. In a preferred embodiment, the synthetic resin is epoxy resin and/or vinyl ester resin, and in a particularly preferred embodiment the synthetic resin is epoxy resin.

The synthetic resin used is not, or not completely, cured during the production of the composite material, i.e. at the time when brought into contact with the gel coat. Preferably the polyurethane gel coat is not completely cured at the time when it is brought into contact with the synthetic resin (preferably when the synthetic resin is applied). This means that in the gel coat when brought into contact with the synthetic resin (preferably when the synthetic resin is applied), the reaction of isocyanate groups with hydroxyl groups to give urethane groups is preferably not yet entirely complete. In all embodiments, synthetic resins which contain glass fibre fabric and/or glass fibre nonwoven or carbon fibre fabric and/or carbon fibre bonded fabric are preferred, wherein the synthetic resin used is especially preferably a prepreg, in particular an epoxy prepreg with glass fibre fabric and/or glass fibre nonwoven or carbon fibre fabric or carbon fibre bonded fabric, or an injection resin.

Moreover, the use of the two-component composition in an in-mould process is especially preferred, wherein the polyurethane gel coat is partially, but not completely, cured and the synthetic resin is not, or not completely, cured at the time when it is brought into contact with the gel coat. In this application, the synthetic resin is preferably partially, but not completely, cured and contains in particular reinforcing material, such as glass fibre fabric and/or glass fibre nonwoven or carbon fibre fabric or carbon fibre bonded fabric.

In the use of the two-component composition in an injection process, after the introduction and gelling (partial curing) of the gel coat, reinforcing material is laid in the mould, the cavity filled with reinforcing material is sealed with a film and the cavity within the reinforcing material evacuated. Next the premixed (e.g. 2-component) synthetic resin (=injection resin) is drawn into the evacuated space and then completely cured. In this embodiment also, glass fibre fabric and/or glass fibre nonwoven or carbon fibre fabric or carbon fibre bonded fabric are preferred as reinforcing materials.

1. Polyol Component

The polyol component used according to the invention is characterized in that it contains at least one polyol with a comparatively low molecular weight and comparatively high hydroxyl group concentration $c_{OH}$. The low molecular weight polyol (or the optionally two, three, four, etc., low molecular weight polyols) has (have) the effect that at the start of the reaction of the polyol component with a polyisocyanate component (after sufficient pot life and acceptable gel time) a very close-meshed network is already formed, which ensures the desired mechanical stability of the gelled gel coat layer.

Low Molecular Weight Polyol

According to the invention, a "low molecular weight polyol" is defined as a polyol with a molecular weight of 160 to 600 g/mol (preferably 180 to 500 g/mol, more preferably 200 to 450 g/mol and in particular 200 to 400 g/mol) and a hydroxyl group concentration of 5 to less than 20 mol hydroxyl groups per kg of low molecular weight polyol. Preferably the hydroxyl group concentration $c_{OH}$ lies in the range from 6 to 15, more preferably 9 to 11 mol hydroxyl groups per kg of low molecular weight polyol.

In principle according to the invention all straight-chain or branched polyols usual for the production of polyurethanes, for example polyether polyols (such as polyoxyethylenes or polyoxypropylenes), polycaprolactone polyols, polyester polyols, acrylate polyols and/or polyols based on dimeric fatty acids and mixtures thereof are suitable as low molecular weight polyols. Examples are the low molecular weight polyols listed below:

- an acrylate-based polyol with a molecular mass of 184 g/mol, a functionality of about 2.3 and a hydroxyl group content of 12.5 mol/kg,
- a polyether polyol with a molecular mass of 181 g/mol, a functionality of 3 and a hydroxyl group content of about 16.5 mol/kg,
- a reaction product from trimethylolpropane and polycaprolactone with a molecular mass of 303 g/mol, a functionality of about 3 and a hydroxyl group content of about 10 mol/kg.

Further preferred low molecular weight polyols are (Table 1):

TABLE 1

| | Average molecular mass | Hydroxyl group concentration $c_{OH}$ (mol/kg) |
|---|---|---|
| Polycaprolactone diol | 400 | 5 |
| Polycaprolactone triol | 300 | 10 |
| Polyester polyol | 400 | 5 |
| Polypropylene oxide triol | 435 | 6.9 |
| Polypropylene oxide triol | 200 | 15.6 |
| Polytetramethylene oxide diol | 250 | 8 |

Preferably, the content of low molecular weight polyol (i.e. the sum of all low molecular weight polyols in the polyol component) lies in the range from 2 to 60 wt. %, more preferably 5 to 50 wt. %, in particular 10 to 45 wt. % such as 20 to 40 wt. %, a content of 32 to 38 wt. % being particularly preferred, based on the total mass of the components A1, A2 and A3 of the polyol component.

Higher Molecular Weight Polyol

The higher molecular weight polyol contained in the polyol component used according to the invention can in principle be any polyol usual for the production of polyurethanes, for example polyester polyol, polyether polyol, polycarbonate polyol, polyacrylate polyol, polyol based on fatty chemical raw materials such as e.g. dimeric fatty acids, or a natural oil such as for example castor oil. The polyols must have an average functionality of ≥2 and a hydroxyl group concentration of less than 5, preferably 1 to 4.99, more preferably 2 to 4, in particular 2.5 to 3.8 mol hydroxyl groups per kg.

Here the components A1 and A2 include all polyols contained in the polyol component used according to the invention, i.e. in general, a polyol which is not a low molecular weight polyol according to the definition stated above counts for the purposes of the present invention as a higher molecular weight polyol. Preferred higher molecular weight polyols have a molecular weight of more than 600 to 8000, preferably more than 600 to 6000, in particular more than 600 to 4000 g/mol of higher molecular weight polyol.

Suitable higher molecular weight polyols are for example described in DE-T-690 11 540. Preferred higher molecular weight polyols are polyether polyols (polyalkoxylene compounds) which are formed by polyaddition of propylene oxide and/or ethylene oxide to starters of low molecular weight with OH groups and a functionality of 2 to 8.

Further typical higher molecular weight polyols are the polyester polyols, which are ester condensation products of dicarboxylic acids with polyalcohols of low molecular weight and have a functionality of 2 to 4, or diol, triol or tetrol-started polycaprolactones, where those higher molecular weight polyester polyols are preferred which have a hydroxyl group concentration in the range from 6 to 15 mol/kg of higher molecular weight polyester polyol, preferably 8 to 12 mol hydroxyl groups per kg. The higher molecular weight polyol (or the optionally two, three, four, etc., higher molecular weight polyols) of the polyol component ensures (ensure) that a sufficiently long lamination time is available. This is important in order to achieve good adhesion to the synthetic resin of the composite material.

Especially preferred higher molecular weight polyols are:

- an acrylate-based polyol with a molecular mass of 606 g/mol, a functionality of about 2.3 and a hydroxyl group content of 3.8 mol/kg,
- a polyether polyol with a molecular mass of 803 g/mol, a functionality of 3 and a hydroxyl group content of about 2.5 mol/kg,
- a reaction product from trimethylolpropane and polycaprolactone with a molecular mass of 909 g/mol, a functionality of about 3 and a hydroxyl group content of about 3.3 mol/kg.

For example the content of higher molecular weight polyol (i.e. the sum of all higher molecular weight polyols) in the polyol component lies in the range from 80 to 5 wt. %, preferably 60 to 5 wt. %, more preferably 80 to 10 wt. % and in particular 25 to 10 wt. %, based on the total mass of the components A1, A2 and A3 of the polyol component. In a preferred embodiment, the polyol component is free from aliphatic dicarboxylic acids.

Light-Resistant Aromatic Amine with Low Reactivity towards Isocyanates

Suitable light-resistant aromatic amines are for example disclosed in U.S. Pat. No. 4,950,792, U.S. Pat. No. 6,013,692, U.S. Pat. No. 5,026,815, U.S. Pat. No. 6,046,297 and U.S. Pat. No. 5,962,617.

Preferred light-resistant aromatic amines are characterized in that, when dissolved in toluene (20 wt. % amine in toluene) and mixed at 23° C. with an equimolar amount of oligomeric HDI isocyanate (hexamethylene diisocyanate) with an NCO content of about 5.2 mol/kg and a viscosity in the range from 2750 to 4250 mPas, dissolved in toluene (80 wt. % isocyanate in toluene), they result in a gel time of more than 30 seconds, preferably more than 3 minutes, more preferably more than 5 minutes, and in particular more than 20 minutes.

A particularly preferred light-resistant aromatic amine is characterized in that, when dissolved in toluene (25 wt. % amine in toluene) and mixed at 23° C. with an equimolar amount of oligomeric HDI isocyanate with an NCO content of about 5.2 mol/kg and a viscosity in the range from 2750 to 4250 mPas, it results in a mixture, where the mixture, when applied onto inert white test plates and cured in the forced-air oven for 30 minutes at 80° C. and then for 60 minutes at 120° C., gives a coating with a dry layer thickness of about 20 μm, where the coating on 300-hour artificial weathering as per ASTM-G 53 (4 hrs UVB 313, 4 hrs condensation) gives a colour shade change delta E (measured as per DIN 5033 part 4 and assessed as per DIN 6174) of at most 50, preferably at most 45, in particular at most 40, such as at most 30.

Light-resistant aromatic amines preferably used according to the invention are methylene-bisanilines, in particular 4,4'-methylenebis(2,6-dialkylanilines), preferably the non-mutagenic methylenebisanilines described in U.S. Pat. No. 4,950,792. The 4,4'-methylenebis(3-$R^1$-2-$R^2$-6-$R^3$ anilines) listed in the following Table 2 are especially suitable.

TABLE 2

| 4,4'-Methylenebis(3-$R^1$-2-$R^2$-6-$R^3$ anilines) | | | |
|---|---|---|---|
|  | $R^1$ | $R^2$ | $R^3$ |
| Lonzacure M-DMA | H | $CH_3$ | $CH_3$ |
| Lonzacure M-MEA | H | $C_2H_5$ | $CH_3$ |
| Lonzacure M-DEA | H | $C_2H_5$ | $C_2H_5$ |
| Lonzacure M-MIPA | H | $C_3H_7$ | $CH_3$ |
| Lonzacure M-DIPA | H | $C_3H_7$ | $C_3H_7$ |
| Lonzacure M-CDEA | Cl | $C_2H_5$ | $C_2H_5$ |

The light-stable aromatic amine particularly preferred according to the invention is 4,4'-methylenebis(3-chloro-2,6-diethylaniline), Lonzacure M-CDEA.

Preferably the content of light-resistant aromatic amine in the polyol component (i.e. the sum of all light-resistant aromatic amines in the polyol component) lies in the range from 0.1 to 20 wt. %, preferably 0.3 to 10 wt. %, more preferably 0.5 to 5 wt. % and in particular 1 to 3 wt. %, based on the total mass of the components A1, A2 and A3 of the polyol component.

Moreover, two-component compositions are preferred which do not contain an aromatic amine which is not light stable, neither in the polyol nor in the polyisocyanate component.

Catalysts accelerate the polymerisation reaction between polyol component and polyisocyanate component. In principle, all catalysts known for use in polyurethanes can be used in the polyol component, preferably the lead, bismuth and tin catalysts disclosed in DE-T 690 11 540, and in addition also the strongly basic amine catalyst 1,4-diazabicyclo(2,2,2)-octane and zirconium compounds.

A catalyst particularly preferred according to the invention for use in a polyol component is dibutyltin dilaurate (DBTL).

A polyol component used according to the invention can contain up to 1 wt. %, more preferably 0.05 to 0.5 wt. %, in particular about 0.3 wt. % of catalyst, for example 0.3 wt. %, based on the total mass of the polyol component.

Fillers

The polyol component according to the invention preferably contains rather large amounts of one or several fillers, where for the purposes of the present description "pigment substances" are included in the definition of the term "filler". Preferred fillers are talc, dolomite, precipitated $CaCO_3$, $BaSO_4$, quartz flour, silica, titanium dioxide, molecular sieves and (preferably calcined) kaolin. The filler content of a polyol component preferably lies in the range from 10 to 80 wt. %, more preferably 20 to 70 wt. %, in particular 35 to 55 wt. % such as 40 to 50 wt. %, based on the total mass of the polyol component. Here mixtures of fillers are preferred, for example mixtures of two, three or four fillers.

In addition, ground glass fibres can be contained in the polyol component, for example ground glass fibres of a length of less than 500 μm. These glass fibres prevent the propagation of any crack.

2. Polyisocyanate Component

Polyisocyanates preferably used in the polyisocyanate component are aliphatic isocyanates, for example the biuret isocyanates disclosed in DE-T 690 11 540 on pages 5 and 6. All isocyanates mentioned there are suitable.

However, the use of aliphatic isocyanates such as 1,6-hexamethylene diisocyanate (HDI), isophorone diisocyanate (IPDI), 4,4'-dicyclohexylmethane diisocyanate ($H_{12}$MDI), 1,4-cyclohexane diisocyanate (CHDI), bis(isocyanatomethyl)cyclohexane ($H_6$XDI, DDI) and tetra-methylxylylene diisocyanate (TMXDI) is preferred. Reference is moreover made to "Szycher's Handbook of Polyurethanes", CRC Press, Boca Raton, 1999.

The silicic acids usable as fillers in the polyisocyanate component are in particular silanised pyrogenic silicic acids. By means of the preferred presence of silicic acid (a thixotropic agent) in the polyisocyanate component, it is ensured that as a result of their similar viscosities the polyol component and polyisocyanate component are readily miscible and moreover the mixture of the components on a vertical area up to 1 mm wet layer thickness does not run off. The content preferably lies in the range from 0.1 to 5 wt. %, more preferably 0.5 to 3 wt. %, in particular 1 to 2 wt. %, based on the total mass of the polyisocyanate component.

Catalysts

The catalysts that can be added to the polyol component can also be contained in the polyisocyanate component, or in the polyisocyanate component instead of the polyol component, in the stated concentrations, and zirconium compounds are preferred as catalysts in the polyisocyanate component.

3. Additives (see Textbook: "Lackadditive", Johan H Bielemann, Weinheim, Wiley-VCH, 1998).

Furthermore, either the polyol component or the polyisocyanate component, or both components, can additionally contain one or several additives selected from antifoaming agents, dispersants and deaerating agents.

Antifoaming Agents (defoamers) can be present in an amount up to 2.0 wt. %, preferably up to 1.0 wt. %, based on the total mass of the component in which they are used.

Deaerating Agents can be present in an amount up to 2.0 wt. %, preferably up to 1.0 wt. %, based on the total mass of the component in which they are used. Many antifoaming agents simultaneously act as deaerating agents.

Dispersants can be present in an amount up to 2.0 wt. %, preferably up to 1.0 wt. %, based on the total mass of the component to which they are added.

In the mixing of the polyol component, the polyols with additives are typically first placed in a vacuum dissolver. The fillers and pigments are then dispersed in the polyols in the vacuum. For the mixing of the polyisocyanate component, the polyisocyanate is usually first taken and mixed with the appropriate additives. Next the filler and the thixotropic agent are dispersed in the vacuum.

The relative quantities of polyol component and polyisocyanate component are (particularly in the two-component composition according to the invention) selected such that hydroxyl groups and isocyanate groups react in the particular desired molar ratio. The molar ratio of hydroxyl groups to isocyanate groups (OH:NCO) usually lies in the range from 1:3 to 3:1, preferably 1:2 to 2:1, more preferably 1:1.5 to 1.5:1. According to a particularly preferred embodiment, the OH:NCO ratio lies close to a stoichiometric molar ratio of 1:1, i.e. in the range from 1:1.2 to 1.2:1, preferably 1:1.1 to 1.1:1, and particularly preferred is an equimolar reaction, i.e. the relative quantities of polyol component and polyisocyanate component are selected such that the molar ratio of the hydroxyl groups to isocyanate groups is about 1:1.

The gelling of the mixture of the two components takes place either at room temperature or, if accelerated gelling is desired, at elevated temperature. For example, gelling can also be performed at a temperature of 40° C., 60° C. or even 80° C. However with the particularly preferred mixture of the components of the two-component composition according to the invention a temperature increase to accelerate the gelling is not absolutely necessary.

The synthetic resin preferably comprises one or several reinforcing materials, such as for example fabric, bonded fabric, nonwoven or preforms made by weaving or sewing, stitching or gluing of fabrics, bonded fabrics or nonwovens. These can consist of glass, carbon, aramide or polyester fibres or of all other thermoplastic plastic fibres. Glass fibre fabric and/or glass fibre nonwoven or carbon fibre fabric or carbon fibre bonded fabric are preferred as reinforcing materials.

When the formation of a mechanically sufficiently stable gel is complete, synthetic resin, for example epoxy resin and if desired glass fibre fabric or glass fibre nonwoven is applied onto the gel coat within the lamination time. By means of polyol components according to the invention and two-component compositions according to the invention, it is achieved that the lamination time available for the lamination lies in the range from about 20 minutes and 72 hours, typically about 48 hours. The lamination process onto gel coats does not differ from the lamination processes which are used without the use of gel coats and are for example described in "Faserverbundbauweisen" by M. Flemming, G. Ziegmann and S. Roth, Springer, Berlin, Heidelberg, New York, 1996. The curing of the gel coat normally takes place at elevated temperature.

In a further embodiment, the invention concerns a process for the production of synthetic resin composite materials with flexible polyurethane gel coats, which comprises (i) the mixing of a two-component composition which comprises
   A) a polyol component, which contains
      A1) one or several low molecular weight polyols with a molecular weight of 160 to 600 g/mol and a hydroxyl group concentration of 5 to less than 20 mol hydroxyl groups per kg of low molecular weight polyol,
      A2) one or several higher molecular weight polyols with an average functionality of ≥2 and a hydroxyl group concentration of less than 5 mol hydroxyl groups per kg of higher molecular weight polyol and
      A3) one or more light-resistant aromatic amines, and
   B) a polyisocyanate component which contains one or several polyisocyanates, and at least partial (and preferably only partial) curing of the mixture and (ii) the bringing of the mixture into contact with synthetic resin, wherein the synthetic resin comprises epoxy resin and/or vinyl ester resin and is not, or not completely, cured at the time when it is brought into contact with the gel coat.

In addition, the invention concerns a synthetic resin composite material with a flexible polyurethane gel coat which is obtainable by the said process. A particularly preferred composite material is a wind vane, i.e. a rotor vane for wind power plants, or a part thereof.

The two-component composition used according to the invention offers the following advantages:
  it is a system consisting of only two components and therefore simple to process.
  the pot life is only 10 to 15 minutes.
  the mixture of polyol component and polyisocyanate component is tack-free within 20 to 70 minutes, even at 0.5 mm layer thickness and room temperature. No heating is necessary for this.
  the lamination time at room temperature is more than 72 hours, hence very good conditions exist for adhesion to epoxy resin and vinyl ester resin laminates.
  up to 1 mm wet layer thickness on a vertical surface, the mixture of the two components is secure against run-off.
  because of the viscosity of the polyisocyanate preferably adjusted with silicic acid, there is good miscibility of the two components.
  the compounds used in the production of the two components are easily manageable in terms of industrial hygiene and emission-free during processing.
  the two components give a transparent gel coat, and can therefore be pigmented at will.
  the mixed components are also usable as a filling compound or as a coating which does not have to be applied in the in-mould process.
  the mixing of the components proceeds spontaneously.
  complete curing of the mixture of the two components can already be attained within 30 minutes to 2 hours at temperatures of 50 to 160° C.

The gel coat produced according to the invention has the following advantageous properties:
  good weathering resistance.
  a long lamination time with short gel and tack-free time.
  after removal from the mould, smooth building component surfaces are obtained without surface defects, although the glass transition temperature $T_G$ is comparatively low at ca. 40° C.

good resistance to hydrolysis.
good resistance to chemicals.
good abrasion resistance simultaneously with high flexibility ($T_g \approx 40°$ C. and Shore hardness D=74).
good grindability. Subsequent treatment of the gel coat is in principle not necessary. However, if large building components are built up from several individual parts, it is necessary to seal the abutting edges with filling compounds. Excess filling material is as a rule ground off. In order to obtain smooth junctions, it is necessary that the gel coat have good grinding properties. The same applies when repair works become necessary on a mechanically damaged surface.
it is essentially free from reactive diluents and plasticisers.

The invention is illustrated by the following examples.

EXAMPLES

Test methods used are described below:

Test Method 1

Sufficiently Low Reactivity of Preferred Amines

For the determination of the gel time, the light-resistant aromatic amine, dissolved in toluene (20 wt. % amine in toluene) is mixed at 23° C. with an equimolar quantity of an oligomeric HDI isocyanate with an NCO content of about 21.8% and a viscosity of the solvent-free isocyanate of 2750 to 4250 mPas, dissolved in toluene (80 wt. % isocyanate in toluene, e.g. Desmodur N3300, Bayer AG). For the determination of the gel time, a Sunshine Gel Time Meter from the firm Sunshine Scientific Instruments is used.

Test Method 2

Weathering Stability of a Preferred Light-Stable Aromatic Amine

For this, the light-resistant aromatic amine dissolved in toluene (25 wt. % amine in toluene) was mixed at 23° C. with an equimolar quantity of an oligomeric HDI isocyanate with an NCO content of about 21.8% and a viscosity of the solvent-free isocyanate of 2750 to 4250 mPas, (e.g. Desmodur N3300, Bayer AG) to give a mixture. The mixture was applied onto inert white test plates and cured in the forced-air oven for 30 minutes at 80° C. and then for 60 minutes at 120° C. This gave a coating with a dry layer thickness of about 20 μm. For the testing of the weathering stability of the coating, coating-covered neutral test plates were exposed to artificial weathering as per ASTM-G 53 (4 hrs UVB 313, 4 hrs condensation). The colour shade change caused by the weathering is measured as per DIN 5033 part 4 after 150 and 300 hours and assessed as per DIN 6174. The delta E values obtained are a measure of the colour tone deviation of the weathered coating and hence the light stability of the aromatic amine.

Test Method 3

Weathering Stability of a Gel Coat According to the Invention (Gel Coat Weathering)

A polyol component which contains a light-resistant aromatic amine is mixed with an isocyanate component and the mixture is applied onto laminate plates and cured. The gel coat obtained is exposed to artificial weathering as per ASTM-G 33 (4 hrs UVB 313, 4 hrs condensation). The colour tone change caused by this is measured as per DIN 5033 part 4 after 900 hours and assessed as per DIN 6174. The delta E values obtained are a measure of the colour tone stability of the gel coat on weathering. The curing took place at 120° C. (1 hr).

Test Method 4

Yellowing Stability of a Gel Coat According to the Invention in a Test at Elevated Temperature (Thermal Yellowing)

As described in test method 3, gel coat-coated laminate plates were prepared. The plates were stored in the forced air oven at 120° C. for 96 hours. The colour tone change caused by this is measured as per DIN 5033 part 4 and assessed as per DIN 6174. The delta E values obtained are likewise a measure of the colour tone stability of the gel coat.

Test Method 5

Abrasion Stability

The abrasion stability of the gel coat was tested as per ASTM-D 4060, Taber abrader, wheel CS 10, loading weight 1000 g, after 500 and 1000 cycles respectively. The abrasion was determined gravimetrically.

Abrasion values preferred according to the invention are (Table 3):

TABLE 3

|  | Preferred | Especially preferred | Quite especially preferred |
|---|---|---|---|
| After 500 cycles | ≤30 mg | ≤30 mg | ≤20 mg | ≤15 mg |
| After 1000 cycles | ≤50 mg | ≤50 mg | ≤40 mg | ≤30 mg |

Test Method 6

Determination of $T_G$ Values of Gel Coats

The glass transition temperature was determined by DSC measurements as per DIN 51007. For this, a cured gel coat test piece was heated from −10° C. to 250° C. at a rate of 10 K/min and the glass transition temperature determined from the heat flow through the sample as per the aforesaid standard. The instrument used for this is a TC11K with a DSC 30 measurement cell from the Mettler company.

Test Method 7

Testing of the Adhesion between Gel Coat and Laminate

A laminate strip 3 cm wide and 20 cm long and of ca. 2 mm thickness which is coated with a 0.7 mm thick layer of a gel coat is broken over a 5 mm mandrel in a bending test as per DIN EN ISO 1519. The fracture edge is visually assessed. A distinction is made between:
a) "No adhesion": i.e. detachment of the gel coat from the laminate already before or during the bending test.
b) "Some adhesion": i.e. delamination in the gel coat-laminate interface (adhesion break) on fracture.
c) "Complete adhesion": i.e. no detachment of the gel coat layer on fracture of the composite component.

Example 1

Use of Test Method 1

The gel time with the use of light-resistant aromatic amines was determined according to test method 1. The results with amines from the Lonza company are shown in Table 4 below:

TABLE 4

| Light-resistant aromatic amine | Gel Time |
| --- | --- |
| M-DEA | 357 secs = 5 mins 57 secs |
| M-MIPA | 221 secs = 4 mins 41 secs |
| M-CDEA | 2635 secs = 43 mins 55 secs |
| M-DIPA | 166 secs = 2 mins 46 secs |

Example 2

Use of Test Method 2

The weathering stability of light-resistant aromatic amines was determined according to test method 2. The results are shown in Table 5 below:

TABLE 5

|  | Lonzacure M-MIPA | Lonzacure M-DIPA | Lonzacure M-CDEA | Lonzacure M-DEA |
| --- | --- | --- | --- | --- |
| Delta E 150 hrs | 21.20 | 19.40 | 28.50 | 24.90 |
| Delta E 300 hrs | 23.10 | 21.10 | 30.20 | 24.90 |

Example 3

Production of Polyol Components

Polyol components were formulated, whose constituents can be seen from Table 6 below.

TABLE 6

|  | PA | PB | PC | PD (Comparison) |
| --- | --- | --- | --- | --- |
| Polycaprolactone polyol (M = 900 g/mol, c(OH) 3.3 mol/kg) | 30 |  |  |  |
| Polycaprolactone polyol (M = 300 g/mol, c(OH) 10 mol/kg) | 60 |  | 40 |  |
| Polyoxypropylene polyol (M = 3000 g/mol, c(OH) 1 mol/kg) |  | 30 |  | 90 |
| Polyoxypropylene polyol (M = 435 g/mol, c(OH) 6.9 mol/kg) |  | 60 |  |  |
| Polyester polyol (M = 785 g/mol, c(OH) 3.8 mol/kg) |  |  | 50 |  |
| 4,4-methylene-bis (3-chloro-2,6-diethylaniline) | 2 | 2 | 2 |  |
| Fillers (talc, $TiO_2$) | 60 | 45 | 50 | 50 |
| Molecular sieve (zeolite) | 15 | 15 | 25 | 15 |
| Light stabilisers (e.g. HALS, UV absorbers) | 2.5 | 2.5 | 2.5 | 2.5 |
| Additives | 0.5 | 0.5 | 0.5 | 0.5 |
| Catalyst: as required to establish a pot life of 10 minutes |  |  |  |  |

M = average molecular mass;
c(OH) = concentration of hydroxyl groups.

Example 4

Polyisocyanate Components

Polyisocyanate components were formulated using the constituents listed in Table 7 below.

TABLE 7

|  | HA | HB | HC |
| --- | --- | --- | --- |
| HDI - biuret (oligomer, viscosity = 2.5 Pa * sec) | 100 |  |  |
| HDI - isocyanurate (oligomer, viscosity = 3.5 Pa * sec) |  | 100 |  |
| Asymmetric HDI trimer (viscosity = 0.7 Pa * sec) |  |  | 100 |
| Pyrogenic silicic acid | 2 | 2 | 3 |
| Additives | 0.5 | 0.5 | 0.5 |

Example 5

Production and Testing of Gel Coats

The production of gel coats and tests thereon are summarised in Table 8 below. The gel coats were produced in each case by mixing a polyol component and a polyisocyanate component, temperature-equalised at 20.5 to 24° C., in a ratio such that a stoichiometric ratio of isocyanate groups to hydroxyl groups was obtained. The mixture was stirred for 3 minutes. The mixture was applied in a layer thickness of 500 μm onto a steel mould which had been degreased with solvent and treated with a parting agent, e.g. Zywax Watershield.

After the application of the gel coat to a steel plate treated with parting agent as the mould, it was overlaid with laminate using the liquid EP lamination resin system "Harz L135" (resin 135) and "Härter 137" (hardener 135) from the company Martin G. Scheuffler, Stuttgart, Germany and a glass bonded fabric. After this, the gel coat together with the laminate was cured for 6 hours at 80° C. by the vacuum bag process. The mechanical properties and durability of the cured gel coat were determined on free films. The test results obtained are shown in Table 8 below.

TABLE 8

Test Results and Differentiation from Previously Available Gel Coats

|  | PA/HA | PB/HB | PC/HC | Comparison PD/HA | Comparison Normal PUR gel coat | Comparison Normal EP gel coat |
|---|---|---|---|---|---|---|
| Adhesion to laminate (test method 7) with 3 hrs lamination time | Complete | Complete | Complete | Partial | Complete | Complete |
| Surface quality | No sink marks | No sink marks | No sink marks | Sink marks | Sink marks | Sink marks |
| Visual appearance | Smooth surface | Smooth surface | Smooth surface | Surface defects | Surface defects | Surface defects |
| Stability against thermal yellowing (test method 5) ($\Delta E$) | 7.3 | n.d. | n.d. | n.d. | 7.9 | 17.1 |
| Weathering stability (test method 3) ($\Delta E$) | 1.5 | n.d. | n.d. | n.d. | 4.1 | 5.5 |
| Breaking stress (N/mm) | 25 | 7.2 | n.d. | n.d | 10 | >25 |
| Elongation at break (%) | 16 | 37 | n.d. | n.d. | 29 | <2 |
| Tear resistance (N/mm) | 9 | 3 | n.d. | n.d. | 12 | brittle fracture |
| Abrasion resistance: (test method 5) | | | | | | |
| 500 cycles (mg) | 15 | n.d. | n.d. | n.d. | 17 | 13 |
| 1000 cycles (mg) | 29 | n.d. | n.d. | n.d. | 31 | 28 |
| Glass transition temperature (° C.) (test method 6) | 41 | n.d. | n.d. | n.d. | 35 | 70 | n.d. = not determined

Result:

On comparison, even after 72 hours lamination time and subsequent 6 hours curing of the composite in the vacuum bag at 80° C., the gel coat formulation according to the invention shows markedly better adhesion properties than the PUR formulations not according to the invention. The surface of the gel coat layer according to the invention displays no faults due to sink marks and thus differs from PUR formulations not according to the invention. In addition, the gel coat formulation according to the invention shows markedly improved resistance to yellowing and weathering compared both to the normal commercial PUR and also EP gel coat formulations. At 40° C., the glass transition temperature of the PUR gel coat according to the invention lies in the vicinity of that which is known for PUR gel coats. In contrast to normal commercial PUR gel coats, however, the PUR gel coat also gives fault-free building component surfaces with no sink marks after removal from the mould, even with curing temperatures over 80° C.

The invention claimed is:

1. An in-mold process for the production of a synthetic resin composite material with a flexible polyurethane gel coat, wherein the process comprises
   (i) mixing a polyol component (A) and a polyisocyanate component (B) and at least partially curing the resultant mixture to form a gel coat material;
   (ii) introducing the gel coat material into a mold; and
   (iii) applying a synthetic resin that comprises at least one of an epoxy resin and a vinyl ester resin onto the gel coat material, the synthetic resin being not, or at least not completely cured at the time it is contacted with the gel coat material and the gel coat material being not completely cured at the time it is contacted with the synthetic resin;
   and wherein
   polyol component (A) is a mixture that comprises
   (A1) one or more low molecular weight polyols having a molecular weight of from 160 to 600 g/mol and from 5 to less than 20 mol of hydroxyl groups per kg of low molecular weight polyol(s);
   (A2) one or more higher molecular weight polyols having a functionality of ≥2 and less than 5 mol of hydroxyl groups per kg of higher molecular weight polyol(s); and
   (A3) one or more light resistant aromatic amines;
   polyisocyanate component (B) comprises one or more polyisocyanates.

2. The process of claim 1, wherein the gel coat material displays an elongation at break at 23° C., measured according to DIN EN ISO 527, of at least 3%.

3. The process of claim 1, wherein the synthetic resin comprises one or more reinforcing materials.

4. The process of claim 3, wherein the one or more reinforcing materials comprise one of more of a glass fiber fabric, a glass fiber nonwoven, a carbon fiber fabric, and a carbon fiber bonded fabric.

5. The process of claim 1, wherein an aromatic amine of component (A3), as a 20 wt.% solution in toluene, mixed at 23° C. with an equimolar quantity of an oligomeric HDI isocyanate having an NCO content of about 5.2 mol/kg and a viscosity of from 2,750 to 4,250 mPas, as a 80 wt.% solution in toluene, affords a gel time, determined according to E-DIN VDE 0291-2, 1997-06, section 9.2.1, of more than 30 seconds.

6. The process of claim 1, wherein an aromatic amine of component (A3), as a 25wt.% solution in toluene, when mixed at 23° C. with an equimolar quantity of an oligomeric HDI isocyanate having an NCO content of about 5.2 mol/kg and a viscosity of from 2,750 to 4,250 mPas, affords a mixture which, when applied onto an inert white test plate and cured in a forced-air oven for 30 minutes at 80° C. and then for 60 minutes at 120° C., affords a coating with a dry layer coating thickness of about 20 μm, which coating, after 300-hour artificial weathering according to ASTM-G 53 with 4 hrs UVB 313, 4 hrs condensation, affords a color shade change delta E, determined according to DIN 5033 part 4 and assessed according to DIN 6174, of at most 50.

7. The process of claim 1, wherein the one or more amines of component (A3) comprise at least one methylenebisaniline.

8. The process of claim 7, wherein the at least one methylenebisaniline comprises 4,4'-methylenebis-(3-chloro-2,6-diethylaniline).

9. The process of claim 1, wherein component (A) comprises from 0.1 to 20wt.% of component (A3), based on a total weight of components (A1), (A2) and (A3).

10. The process of claim 1, wherein component (A) comprises from 2 to 60wt.% of component (A1), based on a total weight of components (A1), (A2) and (A3).

11. The process of claim 10, wherein component (A) comprises from 5 to 50wt.% of component (A1).

12. The process of claim 1, wherein component (A1) comprises from 6 to 15 mol of hydroxyl groups per kg of component (A1).

13. The process of claim 1, wherein component (A1) comprises one or more polyols selected from straight-chain and branched polycaprolactone diols, polycaprolactone triols, polycaprolactone tetrols, polyester polyols, polypropylene oxide triols, polyether polyols, and polytetramethylene oxide diols.

14. The process of claim 1, wherein component (A2) comprises one or more polyols selected from polyester polyols, polyether polyols, polycarbonate polyols, acrylate polyols, and polyols based on fatty chemical raw materials or natural oils.

15. The process of claim 1, wherein component (A2) comprises from 1 to 4.99 mol of hydroxyl groups per kg of component (A2).

16. The process of claim 1, wherein component (A) comprises from 97 to 30wt.% of component (A2), based on a total weight of components (A1), (A2) and (A3).

17. A synthetic resin composite material with a flexible polyurethane gel coat, wherein the composite material is obtained by the process of claim 1.

18. The composite material of claim 17, wherein the composite material is in a form of a rotor vane for a wind power plant, or a part thereof.

* * * * *